United States Patent [19]

Gaylord

[11] 4,269,960

[45] May 26, 1981

[54] PEROXYGEN COMPOUND-6-O-ALKANOYL-L-ASCORBIC ACID REDOX CATALYST SYSTEM FOR VINYL MONOMER POLYMERIZATION

[75] Inventor: Norman G. Gaylord, New Providence, N.J.

[73] Assignee: Dart Industries Inc., Los Angeles, Calif.

[21] Appl. No.: 106,330

[22] Filed: Dec. 21, 1979

[51] Int. Cl.³ .............................................. C08F 14/06
[52] U.S. Cl. .................................. 526/213; 525/253; 526/210; 526/214
[58] Field of Search ............... 526/192, 213, 214, 210; 525/253

[56] References Cited

U.S. PATENT DOCUMENTS

| | | | |
|---|---|---|---|
| 3,515,705 | 6/1970 | Balitrand | 526/192 |
| 4,091,197 | 5/1978 | Fischer et al. | 526/192 |

*Primary Examiner*—William F. Hamrock
*Attorney, Agent, or Firm*—Bryant W. Brennan; Harold R. Beck

[57] ABSTRACT

A process for the bulk or suspension polymerization of vinyl monomers, particularly vinyl chloride, in the presence of a redox catalyst system consisting of a peroxyester or diacyl peroxide and an ascorbic acid ester of a carboxylic acid.

11 Claims, No Drawings

PEROXYGEN COMPOUND-6-O-ALKANOYL-L-ASCORBIC ACID REDOX CATALYST SYSTEM FOR VINYL MONOMER POLYMERIZATION

FIELD OF THE INVENTION

This invention relates to a process for the polymerization of various ethylenically unsaturated monomers, particularly vinyl chloride, in bulk or suspension systems, using a redox catalyst system consisting of a peroxyester or a diacyl peroxide and 6-O-alkanoyl-L-ascorbic acid as reducing agent.

BACKGROUND OF THE INVENTION

The suspension polymerization of vinyl chloride is generally carried out at temperatures below 70° C. using organic soluble initiators. Although lauroyl peroxide was earlier the most widely used catalyst, in recent years other low temperature catalysts including azobisisobutyronitrile, diisopropyl peroxydicarbonate, t-butyl peroxypivalate and mixtures thereof, have been adopted. These and other catalysts are described in Pennwalt Corporation, Lucidol Division, Technical Bulletin 30.90, "Free Radical Initiators for the Suspension Polymerization of Vinyl Chloride" (1977).

The choice of initiator is dictated by its half-life and by its influence on the polymerization process and the properties of the poly(vinyl chloride) produced thereby.

The polymerization of vinyl chloride is characterized by a short induction period, followed by a gradually increasing rate of polymerization. During the earlier stages of the polymerization, the reaction rate is lower than the maximum so that the capacity of the reactor is not fully utilized. Peroxyesters reduce the induction period and, due to a more constant rate of polymerization, increase reactor productivity. Further, peroxyesters can generally be used at levels below that needed for peroxides and give much less chain branching during polymerization.

Although peroxyesters such as diisopropyl peroxydicarbonate and t-butyl peroxypivalate offer numerous advantages in vinyl chloride polymerization, their disadvantages include the necessity for low temperature shipping and storage and decreased efficiency at elevated temperatures.

The use of peroxyesters having higher decomposition temperatures is not feasible in present poly(vinyl chloride) production facilities due to the higher monomer pressures involved and the low molecular weight and poorer stability of the resultant resins. Nevertheless, the handling advantages of such peroxyesters makes their use extremely attractive.

The use of higher temperature catalysts at lower temperatures is a common practice in polymer technology. Thus, redox systems such as ammonium persulfate—sodium metabisulfite and hydrogen peroxide—ferrous sulfate are used in emulsion polymerization while benzoyl peroxide—dimethylaniline and methyl ethyl ketone peroxide—cobalt naphthenate are used in styrene—unsaturated polyester polymerization.

Reducing agents used in conjunction with monomer-soluble peroxyesters in the polymerization of vinyl chloride include potassium metabisulfite (N. Fischer and C. Lambling, French Patent No. 2,086,635 (1972), sodium bisulfite (H. Minato, K. Hashimoto, and T. Yasui, Japan. Patent No. 68 20,300 (1968), sodium bisulfite-cupric chloride (B. K. Shen, U.S. Pat. No. 3,668,194 (1972), sodium dithionite-ferrous sulfate (H. Minato, Japan. Patent No. 70 04,994 (1970) and trialkyl boron (R. Kato and I. Soematsu, Japan Patent No. 5498('65) (1965); A. V. Ryabov, V. A. Dodonov, and Y. A. Ivanova, Tr. Khim. Khim. Tekknol., 1970, 238; Stockholms Superfosfat Fabriks A/B, Brit. Patent No. 961,254 (1964).

Reducing agents used in conjunction with monomer-soluble diacyl peroxides in the polymerization of vinyl chloride include ferrous sulfate-sodium hydroxide (A. M. Sharetskii, S. V. Svetozarskii, E. N. Zil'berman, and I. B. Kotlyar, Brit. Patent No. 1,164,250 (1969) and U.S. Pat. No. 3,594,359 (1971), ferrous caproate (J. Ulbricht and N. V. Thanh, Plaste Kaut., 21, 186 (1974); J. Ulbricht and G. Mueller, Plaste Kaut., 21, 410 (1974) and trialkyl boron (A. V. Ryabov, V. A. Dodonov, and Y. A. Ivanova, Tr. Khim. Khim. Tekknol., 1970, 238).

Ascorbic acid has been used as the sole reducing agent or in combination with cupric, ferrous or ferric salts, in the polymerization of vinyl chloride in the presence of water-soluble catalysts including hydrogen peroxide (H. I. Roll, J. Wergau and W. Dockhorn, Ger. Offen. Patent No. 2,208,442 (1973); J. A. Cornell, U.S. Pat. No. 3,534,010 (1970); K. Okamura, K. Suzuki, Y. Nojima and H. Tanaka, Japan. Patent No. 18,954('64) (1964); H. Watanabe, S. Yamanaka and Y. Amagi, Japan. Patent No. 16,591('60) (1960), potassium persulfate (K. H. Prell, E. Plaschil and H. Germanus, East Ger. Patent No. 75,395 (1970), cumene hydroperoxide (R. J. S. Matthews, Brit. Patent No. 931,628 (1963), acetyl cyclohexanesulfonyl peroxide (Dynamit Nobel A. G., Netherlands Appl. No. 6,408,790 (1965), and a mixture of hydrogen peroxide and acetyl cyclohexanesulfonyl peroxide (R. Buning, K. H. Diessel and G. Bier, Brit. Patent No. 1,180,363 (1970).

Ascorbic acid has been disclosed as a complexing agent in the polymerization of vinyl chloride in the presence of a diacyl peroxide and various water-soluble metal salts (N. Fischer, J. Boissel, T. Kemp and H. Eyer, U.S. Pat. No. 4,091,197 (1978).

6-O-Palmitoyl-L-ascorbic acid has been used as reducing agent in the polymerization of vinyl chloride in the presence of hydrogen peroxide (K. Kamio, T. Tadasa and K. Nakanishi, Japan. Patent No. 71 07,261 (1971) and methyl ethyl ketone peroxide (K. Kamio, T. Tadasa and K. Nakanishi, Japan. Patent No. 70 25,513 (1970).

The water-soluble peroxygen compounds and reducing agents are more suitable for emulsion than for bulk or suspension polymerization, the trialkyl borons react with oxygen and require special handling and the presence of the various metal compounds such as copper and iron salts is detrimental to the properties of poly(vinyl chloride).

SUMMARY OF THE INVENTION

An object of the present invention is to provide a process for the polymerization of ethylenically unsaturated monomers, particularly vinyl chloride, in the presence of peroxygen compounds at temperatures at which the latter are stable and readily handled. Another object of the present invention is to provide a process for the bulk or suspension polymerization of vinyl chloride at temperatures below 70° C. using peroxygen compounds which, at these temperatures, do not generate free radicals at a sufficient rate to initiate polymerization at a practical rate, if at all.

It has now been found that this improvement in unsaturated monomer, particularly vinyl chloride, polymerization can be achieved by utilizing a redox catalyst system consisting of a peroxyester or a diacyl peroxide and a 6-O-alkanoyl-L-ascorbic acid.

DETAILED DESCRIPTION OF THE INVENTION

According to the present invention, the polymerization of ethylenically unsaturated monomers, particularly vinyl chloride, is carried out in bulk or suspension, under the conditions applicable thereto and well known to those skilled in the art, using a catalyst system consisting of a monomer-soluble peroxyester or diacyl peroxide as oxidant and a 6-O-alkanoyl-L-ascorbic acid as reducing agent.

The half-life of a free radical catalyst is the time required for 50% decomposition at a particular temperature. The half-life is only relevant as regards the temperature at which it is desired to conduct a polymerization, e.g. the polymerization of vinyl chloride below 70° C. to produce poly(vinyl chloride) with greater thermal stability than polymer produced above 70° C. The half-life of a peroxyester refers to thermal decomposition and, consequently, if a polymerization is to be conducted at 50° C., a catalyst with a half-life of 20 hours or less at 50° C., can be used for the polymerization, e.g. t-butyl peroxypivalate or t-butyl peroxyneodecanoate, as is well known to those skilled in the art.

However, if it is desired to conduct the polymerization with a catalyst which does not require refrigerated shipment and/or storage, which are required by t-butyl peroxypivalate and t-butyl peroxyneodecanoate, than in accordance with the present invention, a catalyst with a half-life of more than 50 hours at 50° C. can be used in the presence of a suitable reducing agent, e.g. t-butyl peroxyoctoate which has a half-life of 133 hours at 50° C. in the absence of the reducing agent may be used.

Alternatively, if it is desired to conduct polymerization at or below 25° C., in order to maintain better control of the reaction exotherm or to obtain a higher molecular weight, less branched polymer, the aforementioned peresters, despite the requirement for refrigerated shipping and storage, having half-lives of more than 150 hours at 25° C., may be used in the presence of a suitable reducing agent.

The process of the present invention utilizes a peroxygen compound such as a peroxyester and a diacyl peroxide, in the presence of a suitable reducing agent, at a temperature where the peroxygen compound has a half-life of more than 50 hours in the absence of the reducing agent.

The peroxyesters which may be used in the process of the present invention are the alkyl and aralkyl peroxyesters of aliphatic or aromatic carboxylic acids or carbonic acid and may be represented by the structural formula

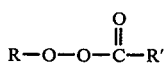

where R is an alkyl, aralkyl or alkoxycarbonyl group, R' is an alkyl, aralkyl, aryl or alkoxy group, and R and R' are the same or different. When R and/or R' contain alkyl or aralkyl moieties, the latter may contain 1-20 carbon atoms and may be primary, secondary or tertiary, linear or branched, acyclic or cyclic, saturated or unsaturated and may contain non-hydrocarbon substituents including halogen and hydroxyl groups. When R' is an aromatic moiety, it may be unsubstituted or may contain hydrocarbon, halogen and/or other substituents.

The peroxyesters may be monoperoxyesters or the diperoxyesters of dicarboxylic acids or diols.

Representative peroxyesters include t-butyl peroxyacetate, t-butyl peroxyisobutyrate, t-butyl peroxypivalate, t-butyl peroxyneodecanoate, t-butyl peroxybenzoate, t-butyl peroxyoctoate, t-butyl peroxy(2-ethylhexanoate), t-amyl peroxyneodecanoate, cumyl neodecanoate, isobutyl peroxypivalate, sec-butyl peroxybenzoate, n-butyl peroxyoctoate, t-butyl peroxy-3,3,5-trimethylhexanoate, t-butyl peroxy-2-methylbenzoate, 2,5-dimethyl-2,5-bis(2-ethylhexanoylperoxy)hexane, 2,5-dimethyl-2,5-bis(benzoylperoxy)hexane, 2,5-dimethyl-2,5-bis(octanoylperoxy)-hexane, di-t-butyl diperoxyphthalate, t-butyl peroxymaleic acid, t-butyl peroxyisopropylcarbonate, di(sec-butyl) peroxydicarbonate, bis(4-t-butylcyclohexyl)peroxydicarbonate, diisopropyl peroxydicarbonate, di(n-propyl)peroxydicarbonate, di(2-ethylhexyl)peroxydicarbonate, dicyclohexyl peroxydicarbonate, dicetyl peroxydicarbonate and the like.

Aliphatic diacyl peroxides including acetyl peroxide, lauroyl peroxide, decanoyl peroxide and isononanoyl peroxide, as well as aromatic diacyl peroxides including benzoyl peroxide, p-chlorobenzoyl peroxide and 2,4-dichlorobenzoyl peroxide may be used in conjunction with the reductants of the present invention at a temperature where the diacyl peroxide has a half-life of more than 50 hours in the absence of the reductant.

The process of the present invention is carried out with a redox catalyst system consisting of a monomer-soluble peroxygen compound and a reductant. In bulk polymerization, a monomer-soluble reductant is required, while suspension polymerization permits the use of either a monomer-soluble or a monomer-insoluble reductant.

The ascorbic acid esters which may be used as reductants in the practice of the present invention include the ascorbic acid esters of aliphatic and aromatic carboxylic acids. The aliphatic carboxylic acids contain 1-26 carbon atoms and may be linear or branched with hydrocarbon or non-hydrocarbon substituents such as halogen groups, cyclic or acyclic, saturated or unsaturated and monocarboxylic or polycarboxylic. The aromatic carboxylic acids may be monocarboxylic or polycarboxylic, unsubstituted or substituted with hydrocarbon or non-hydrocarbon substituents. The hydrocarbon substituents in the branched aliphatic carboxylic acids or the aromatic carboxylic acids may be alkyl or aryl groups where the alkyl groups contain 1-18 carbon atoms and may be linear or branched, cyclic or acyclic, saturated or unsaturated.

Representative esters include the ascorbic acid esters of acetic acid, propionic acid, butanoic acid, pentanoic acid, 2-methylbutanoic acid, caproic acid, 3-methylpentanoic acid, caprylic acid, octanoic acid, 2-ethylhexanoic acid, enanthic acid, capric acid, pelargonic acid, undecanoic acid, lauric acid, myristic acid, palmitic acid, stearic acid, arachidic acid, behenic acid, lignoceric acid, cerotic acid, oxalic acid, malonic acid, succinic acid, glutaric acid, adipic acid, sebacic acid, dodecenylsuccinic acid, hexahydrophthalic acid, tetrahydrophthalic acid, oleic acid, elaidic acid, linoleic acid, α-eleostearic acid, β-eleostearic acid, α-linolenic acid, erucic acid, ricinoleic acid maleic acid, fumaric acid, itaconic acid, crotonic acid, cinnamic acid, benzoic acid, aconitic acid, phthalic acid, citraconic acid, isophthalic acid, terephthalic acid, naphthoic acid and the like.

The peroxygen compound/reductant mole ratio is generally 1/0.01-2, with a preferred mole ratio of 1/0.1-1. The addition of the peroxygen compound and the reductant to the reaction mixture may be made in any order, with the total amount of either or both being added initially or intermittently as the reaction proceeds.

The concentration of peroxygen compound is generally 0.01-5% by weight of the vinyl monomer, with a preferred concentration of 0.05-1% by weight.

The procedures normally used in the bulk and suspension polymerization of vinyl chloride are applicable to the process of the present invention. Typical procedures are described in Encyclopedia of Polymer Science and Technology, 14, 339-343 (1971), the disclosure of which is incorporated herein by reference.

The polymerization may be conducted at or above atmospheric pressure. In the usual procedure, the reactor is charged at atmospheric pressure and the pressure rises when the contents of the reactor are brought to reaction temperature. The pressure may increase further due to the reaction exotherm and then remain constant until the conversion reaches about 70%, after which it decreases rapidly as the reaction continues.

The polymerization temperature may range from −50° to +70° C. for bulk polymerization, although temperatures of 40° to 60° C. are preferred. Suspension polymerization may be carried out at temperatures of +5° to +70° C., although preferred temperatures are in the 20°-60° C. range.

The concentrations of monomer and water, e.g. about 2/1 weight ratio, and the types and concentrations of suspending agents are those normally used in suspension polymerization and are well known to those skilled in the art. Typical suspending agents include poly(vinyl alcohol), partially saponified poly(vinyl acetate), gelatin, methylcellulose, vinyl acetate-maleic anhydride copolymer and the like. Various emulsifiers such as sulfonated oils and ethylene oxide condensation products may be added to control surface tension and particle shape. Buffers may be used, where necessary, e.g. when gelatin is used as suspending agent. Chain transfer agents such as chlorinated hydrocarbons and isobutylene may be used in the preparation of low molecular weight polymer.

Although the peroxyester-reductant redox catalyst system of the present invention is particularly useful in the bulk and suspension polymerization of vinyl chloride, the redox system may also be used in the copolymerization of vinyl chloride with vinylidene chloride, vinyl acetate and other monomers which undergo copolymerization with vinyl chloride.

The homopolymerization and copolymerization of other ethylenically unsaturated monomers which are subject to free radical polymerization may be carried out with the peroxyester-reductant redox catalyst system of the present invention. Representative monomers include ethylene, vinylidene chloride, styrene, vinyltoluene, α-methylstyrene, p-chlorostyrene, p-chloromethylstyrene, butadiene, isoprene, piperylene, chloroprene, vinyl acetate, vinyl propionate, vinyl benzoate, acrylic and methacrylic esters including methyl acrylate, ethyl acrylate, butyl acrylate, 2-ethylhexyl acrylate, lauryl acrylate, methyl methacrylate, ethyl methacrylate, butyl methacrylate, lauryl methacrylate, octadecyl methacrylate, acrylic acid, methacrylic acid, acrylonitrile, methacrylonitrile, acrylamide, methacrylamide, maleic anhydride and the like. The ethylenically unsaturated monomers which undergo polymerization in the presence of a free radical initiator are well known to those skilled in the art and undergo homopolymerization and copolymerization in the presence of the peroxygen compound-reductant catalyst system of the present invention.

The following examples are illustrative embodiments of the practice of the present invention and are not to be construed as limitations on the invention or the claims. Numerous modifications will be obvious to those skilled in the art.

EXAMPLE I

A 4 oz glass bottle was charged with the following suspension recipe:
21 ml distilled water (boiled)
1 ml 1% aqueous solution of Tween 60 (polyoxyethylene sorbitan monostearate, Atlas Chemical Industries Inc.)
1 ml 1% aqueous solution of Span 60 (sorbitan monostearate, Atlas Chemical Industries Inc.)
2 ml 1% aqueous solution of Methocel A-15 (methylcellulose with viscosity of 15 cps as a 2% aqueous solution, Dow Chemical Co.)

Nitrogen was bubbled through the aqueous solution for 15 minutes.

Gaseous vinyl chloride was purified by passage through two 5% aqueous sodium hydroxide solutions, dried by passage through a silica gel column and then condensed with the aid of a dry ice bath. After 0.05 g (0.115 mmole) 6-O-palmitoyl-L-ascorbic acid and 10 g liquid vinyl chloride were added to the suspension recipe, the bottle was closed with a screw cap containing a center hole and a self-sealing gasket. The addition of 0.055 ml (0.23 mmole) t-butyl peroxyoctoate (0.5% by weight of vinyl chloride) was made by injection through the gasket using a hypodermic syringe. The bottle was placed in a 50° C. constant temperature bath and shaken for 6.5 hours. The residual monomer was released and a 7.8 g yield (78% conversion) of poly(vinyl chloride) beads was isolated.

EXAMPLE II

The procedure of Example I was repeated, using the same suspension recipe, with 10 g vinyl chloride, 0.019 g (0.046 mmole) 6-O-palmitoyl-L-ascorbic acid and 0.022 ml (0.092 mmole) t-butyl peroxyoctoate (0.2% by weight of vinyl chloride). After 7 hours at 50° C., the conversion was 40%.

EXAMPLE III

The procedure of Example I was repeated, using the same suspension recipe, with 10 g vinyl chloride, 0.035 g (0.115 mmole) 6-O-octoyl-L-ascorbic acid and 0.055 ml (0.23 mmole) t-butyl peroxyoctoate (0.5% by weight of vinyl chloride. After 16 hours at 50° C., the conversion was 60%.

EXAMPLE IV

The procedure of Example I was repeated using a 6 oz glass bottle with the same suspension recipe and 10 g vinyl chloride, 0.02 g (0.046 mmole) 6-O-palmitoyl-L-ascorbic acid and 0.055 ml (0.23 mmole) t-butyl peroxyoctoate (0.5% my weight of vinyl chloride). After 11 hours at 50° C., the conversion was 100%.

EXAMPLE V

The procedure of Example IV was repeated using a 6 oz glass bottle with the same suspension recipe and 10 g vinyl chloride, 0.01 g (0.023 mmole) 6-O-palmitoyl-L-ascorbic acid and 0.055 ml (0.23 mmole) t-butyl peroxyoctoate (0.5% by weight of vinyl chloride). After 7 hours at 50° C., the conversion was 83%.

EXAMPLE VI

A. A 100 ml glass bottle was charged with 10 ml of an aqueous solution containing 0.0006 g Nacconol 90 F anionic alkyl aryl sulfonate (Allied Chemical Co.) and 0.06 g tricalcium phosphate. The contents were stirred thoroughly to wet the solids and the mixture was degassed by bubbling nitrogen through the suspension for 15 minutes. After 10 g distilled styrene, 0.11 ml (0.46 mmole) t-butyl peroxyoctoate (1% by weight of styrene) and 0.1 g (0.23 mmole) 6-O-palmitoyl-L-ascorbic acid were introduced, the bottle was closed under nitrogen and shaken in a constant temperature bath for 12 hours at 50° C. The reaction mixture was cooled to 25° C., the aqueous layer was separated and the residue was dissolved in acetone. The polymer was precipitated in methanol, filtered and dried in vacuo at 40° C. The yield of polystyrene was 9.1 g (91% conversion).

B. A bottle was charged in the same manner and with the same reactants as in A except for the omission of 6-O-palmitoyl-L-ascorbic acid. After 12 hours at 50° C., the yield of polystyrene was 1.5 g (15% conversion) due to thermal polymerization.

EXAMPLE VII

A. A 100 ml glass bottle was charged with 10 g methyl methacrylate, 0.11 ml (0.46 mmole) t-butyl peroxyoctoate and 0.1 g (0.23 mmole) 6-O-palmitoyl-L-ascorbic acid. After 4.5 hours at 50° C., the contents were cooled to 25° C., dissolved in acetone and precipitated in methanol. The yield of polymer was 9.4 g (94%).

B. A bottle was charged in the same manner and with the same reactants as in A except that the 6-O-palmitoyl-L-ascorbic acid was omitted. No polymer was recovered after 4.5 hours at 50° C.

While particular embodiments of this invention have been disclosed above, it will be understood that the invention is obviously subject to variation and modification without departing from its broader aspects.

What is claimed is:

1. A process for the preparation of polymers and copolymers of ethylenically unsaturated monomers subject to free radical polymerization, which consists in polymerization in bulk or suspension, at a temperature of 70° C. or below in the presence of a redox catalyst system consisting essentially of a peroxygen compound selected from the class consisting of peroxyesters and diacyl peroxides, and a 6-O-alkanoyl-L-ascorbic acid as a reducing agent and wherein the polymerization is carried out at a temperature where the peroxygen compound has a half-life of more than 50 hours in the absence of the reducing agent.

2. The process of claim 1 wherein said monomer is vinyl chloride.

3. The process of claim 1 wherein said polymerization temperature is in the range from −50° to +70° C.

4. The process of claim 1 wherein said polymerization temperature is between 20° and 60° C.

5. The process of claim 1 wherein said peroxyester is selected from the class consisting of alkyl peroxyesters of aliphatic carboxylic acids, aromatic carboxylic acids and carbonic acid.

6. The process of claim 1 wherein said reducing agent is the ascorbic acid ester of an aliphatic or aromatic carboxylic acid.

7. The process of claim 6 wherein said ascorbic acid ester is selected from the class consisting of 6-O-octoyl-L-ascorbic acid and 6-O-palmitoyl-L-ascorbic acid.

8. The process of claim 5 wherein the peroxyester is t-butyl peroxyoctoate.

9. The process of claim 1 wherein said diacyl peroxide is selected from the class consisting of lauroyl peroxide and benzoyl peroxide.

10. The process of claim 1 wherein said monomer is methyl methacrylate.

11. The process of claim 1 wherein said monomer is styrene.

* * * * *